US008527512B2

(12) United States Patent
Depreter

(10) Patent No.: US 8,527,512 B2
(45) Date of Patent: Sep. 3, 2013

(54) METHOD FOR PERFORMING A DATABASE QUERY IN A RELATIONAL DATABASE

(75) Inventor: Frédéric Depreter, Le Roeulx (BE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 12/561,389

(22) Filed: Sep. 17, 2009

(65) Prior Publication Data
US 2010/0082588 A1   Apr. 1, 2010

(30) Foreign Application Priority Data
Sep. 26, 2008 (EP) .................................... 08016961

(51) Int. Cl.
G06F 7/00 (2006.01)
G06F 17/30 (2006.01)

(52) U.S. Cl.
USPC ........... 707/736; 707/741; 707/742; 707/743; 707/744; 707/745

(58) Field of Classification Search
USPC ................. 707/705, 736, 741, 742, 743, 744, 707/745, 746, 999.1, 999.102
See application file for complete search history.

(56) References Cited

U.S. PATENT DOCUMENTS

| | | | | |
|---|---|---|---|---|
| 6,167,399 A * | 12/2000 | Hoang | ................ | 707/999.002 |
| 6,374,275 B2 * | 4/2002 | Wasilewski | ................ | 715/259 |
| 7,020,647 B1 * | 3/2006 | Egan et al. | ................ | 707/741 |
| 7,020,661 B1 * | 3/2006 | Cruanes et al. | ............ | 707/999.1 |
| 7,761,407 B1 * | 7/2010 | Stern | ............................. | 707/602 |
| 8,019,783 B2 * | 9/2011 | Gill et al. | ....................... | 707/791 |
| 8,219,564 B1 * | 7/2012 | Shao et al. | ..................... | 707/743 |
| 2002/0016804 A1 | 2/2002 | Wasilewski | | |
| 2003/0088715 A1 * | 5/2003 | Chaudhuri et al. | ........... | 709/330 |
| 2005/0198019 A1 * | 9/2005 | Cunningham et al. | ............. | 707/3 |
| 2006/0095407 A1 * | 5/2006 | Ortega et al. | ..................... | 707/3 |
| 2008/0027788 A1 * | 1/2008 | Lawrence et al. | ................. | 705/10 |
| 2011/0004622 A1 * | 1/2011 | Marson | ......................... | 707/770 |

FOREIGN PATENT DOCUMENTS
WO   9857277 A1   12/1998

OTHER PUBLICATIONS

Chaudhuri et al.: "An Overview of Data Warehousing and OLAP Technology" Mar. 1997, Magazine, pp. 65-74, XP-002193792.
Schneidermann, B: "Designing the user interface" Chapter 15 "Information Search and Visualization", pp. 519-521, 526-541, Jan. 1, 1992 Reading, Addison Wesley, US, XP-002210867.
Young et al.: "A Graphical Filter/Flow Representation of Boolean Queries: A Prototype Implementation and Evaluation", Book, 1993, pp. 1-32, XP-002210916.

* cited by examiner

Primary Examiner — Hares Jami
(74) Attorney, Agent, or Firm — Laurence A. Greenberg; Werner H. Stemer; Ralph E. Locher

(57) ABSTRACT

A method performs a database query in a relational database, the query being carried out by a database engine and being based on user-defined search criteria. The method includes retrieving a number N of properties of a record within a main database table, the number N being higher than zero, creating a search criteria option for each of the N properties, creating a search criteria table for every search criteria option, creating an index for every search criteria table, and performing the database query based on a user-defined combination of a plurality of the search criteria options.

10 Claims, 2 Drawing Sheets

| PRODUCT | LOCATION | PACK | FACTORY |
| --- | --- | --- | --- |
| Mushroom soup | Rack 1.1.1 | Can | F1 |
| Tomato soup | Rack 1.1.2 | Bag | F2 |
| Minestrone | Rack 1.1.3 | Can | F3 |
| Mushroom soup | Rack 1.1.4 | Bag | F1 |
| Tomato soup | Rack 1.1.5 | Can | F2 |
| Minestrone | Rack 1.1.6 | Bag | F3 |

FIG. 2

| PRODUCT | LOCATION |
| --- | --- |
| Mushroom soup | Rack 1.1.1, Rack 1.1.4 |
| Tomato soup | Rack 1.1.2, Rack 1.1.5 |
| Minestrone | Rack 1.1.3, Rack 1.1.6 |

FIG. 3

| PACK | LOCATION |
| --- | --- |
| Can | Rack 1.1.1, Rack 1.1.3, Rack 1.1.5 |
| Bag | Rack 1.1.2, Rack 1.1.4, Rack 1.1.6 |

FIG. 4

| FACTORY | LOCATION |
| --- | --- |
| F1 | Rack 1.1.1 |
| F2 | Rack 1.1.2 |
| F3 | Rack 1.1.3 |

FIG. 5

| LOCATION |
| --- |
| Rack 1.1.1 |
| Rack 1.1.2 |
| Rack 1.1.3 |
| Rack 1.1.4 |
| Rack 1.1.5 |
| Rack 1.1.6 |

FIG. 6

METHOD FOR PERFORMING A DATABASE QUERY IN A RELATIONAL DATABASE

CROSS-REFERENCE TO RELATED APPLICATION

This application claims the priority, under 35 U.S.C. §119, of European application EP 08 016 961.8, filed Sep. 26, 2008; the prior application is herewith incorporated by reference in its entirety.

BACKGROUND OF THE INVENTION

Field of the Invention

The invention is related to a method for performing a database query in a relational database, especially by providing a combination of user-specific search criteria.

Relational database systems provide a number of possibilities to search a database according to a search criterion. One approach is to scan all records one by one based on the search criterion and return all matching records. However, this approach is very slow in case the database contains a large number of records. In order to speed up the database query, the relational database system provides a possibility to create an index on a specific column of the database. Indexes enhance the speed of a database query, especially in a case where a structure of the database is very simple, thus using very few columns for a record. However, in case the record is very complex, in other words consisting of many properties, the indexes have two drawbacks:

A first drawback consists in the fact that an indexing approach lacks in an adaptation to allow the combination of the user-specific search criteria, in other words it lacks in providing an efficient way to use more complicated search patterns being individually defined by a user according to specific search needs. In a context of using many search criteria according to any combination between the search criteria, it is impossible to provide a generic database software solution allowing the totality of properties and thus the combination of the search criteria based on the properties, to be forecast and indexed. It is possible to forecast a fixed number of columns on a table reserved for the properties. However, the number of columns on the table has a physical limitation in all of the database systems. This limitation is also faced in case the user is allowed to add further columns. In addition, the database system allowing the user to add the columns is practically unmanageable in the generic database software solution.

A second drawback consists in the fact that a database engine of the relational database system only uses a maximum of one index to scan the table. Due to this fact, a number of the indexes become too large in case of an optimization attempt which would be reached by creating the indexes for each one of the combinations. This results in a significant reduction of a performance with respect to data modifications. It is possible to create the indexes for more than one column but the indexes are only used in the query when at least a first index of the totality of the indexes is specified in the query. The number of indexes is dramatically growing if they have to be created for all of the possible combinations of a required coverage of a totality of the user-defined search criteria. Again, the performance with respect to the data modifications is seriously decreased.

SUMMARY OF THE INVENTION

It is accordingly an object of the invention to provide a method for performing a database query in a relational database that overcome the above-mentioned disadvantages of the prior art devices and methods of this general type, which allows a usage of multiple indexes in an efficient way in order to provide the combination of the user-specific search criteria, in other words to increase a search criteria flexibility and at the same time to at least keep the performance of the data modification unchanged.

One way the goal is achieved is by providing a method for performing a database query in a relational database, the query being carried out by a database engine and being based on user-defined search criteria. The method includes retrieving a number N of properties of a record within a main database table, the number N being higher than zero, creating a search criteria option for each of the N properties, creating a search criteria table for every search criteria option, creating an index for every search criteria table, and performing the database query based on a user-defined combination of a plurality of the search criteria options.

In a first step, the database is scanned for all search possibilities, meaning that all searchable properties related to the database structure, thus the number N of properties, are retrieved. In a second step, the search criteria options are assigned to the N properties, in other words user-selectable criteria for a custom query are created. In a third step, a number of tables are created, whereby each one of these search criteria tables is created based on a specific search possibility. The search criteria tables have a reduced complexity due to an elimination of irrelevant search options, in other words one distinct table is created for each searchable property in dependence of all other of the N properties. In a fourth step, each of the search criteria tables is indexed. In a fifth step, the database query is performed by using the user-defined combination of the plurality of the search criteria options, in other words the user chooses a set of specific search criteria options out of the N search criteria options.

The main advantage of the presented method is that the user has the possibility to define as many search criteria as necessary and at the same time to eliminate a limitation due to a fixed number of columns of the main database table imposed by the used database system. Another advantage is that multiple indexes are used to perform the custom search, thus increasing an effectiveness of the search.

With the foregoing and other objects in view there is provided, in accordance with the invention a non-transitory computer-readable storage medium with an executable program stored thereon and being organized as a software library, the library being importable in a database software system. The program instructs a microprocessor to retrieve a number N of properties of a record within a main database table, the number N being higher than zero, create a search criteria option for each of the N properties, create a search criteria table for every search criteria option, and create an index for every search criteria table. A database query is performed based on a user-defined combination of a plurality of the search criteria options.

Other features which are considered as characteristic for the invention are set forth in the appended claims.

Although the invention is illustrated and described herein as embodied in a method for performing a database query in a relational database, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a table showing an example of a database table;

FIG. 3 is a table showing an Index "PRODUCT" for search criterion "LOCATION";

FIG. 4 is a table showing an for Index "PACK" for search criterion "LOCATION";

FIG. 5 is a table showing an Index "FACTORY" for search criterion "LOCATION"; and FIG. 6 is a table showing a List of locations of type "LOCATION".

DETAILED DESCRIPTION OF THE INVENTION

Figure 1:
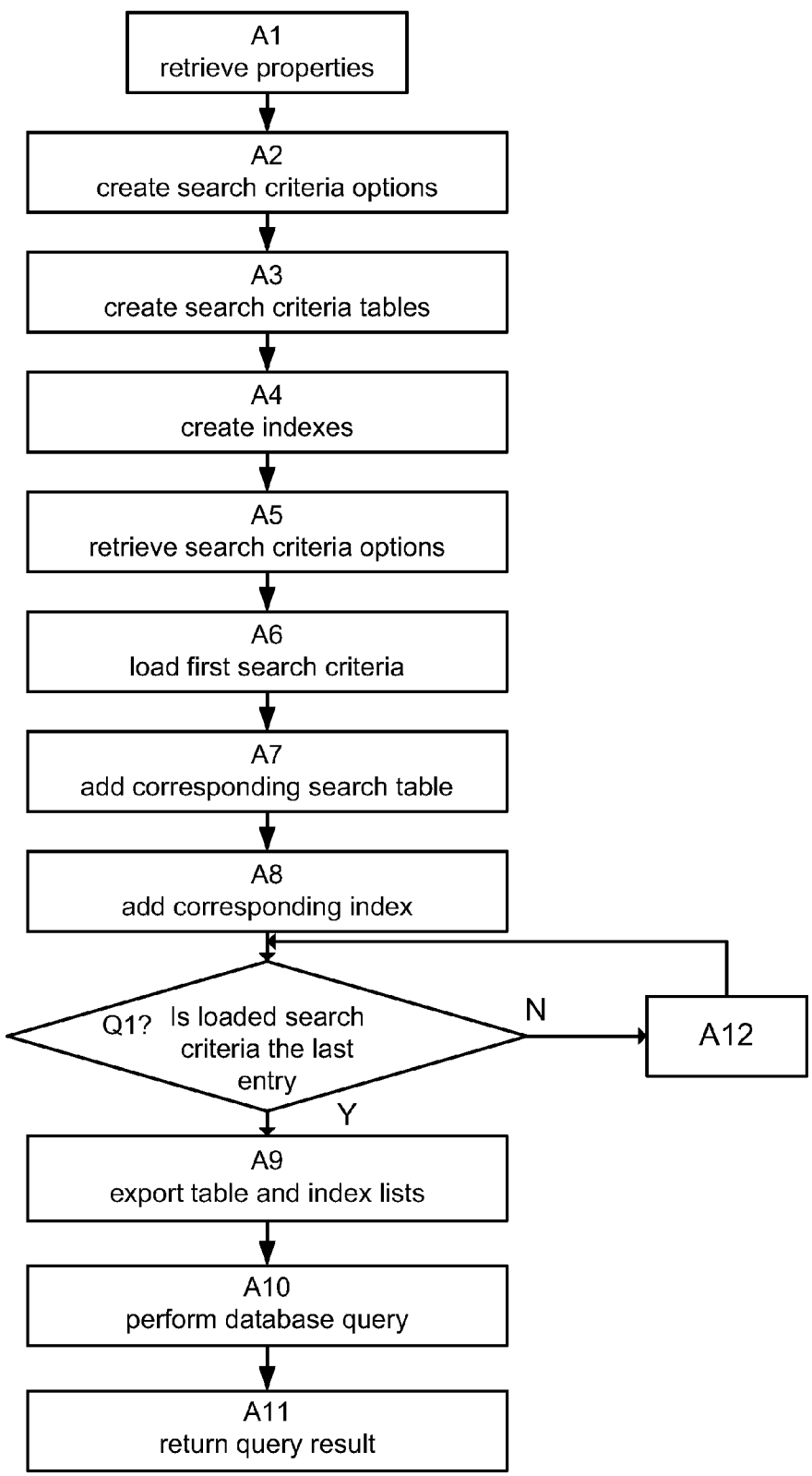
FIG. 1 is a flowchart of an algorithm for an implementation of a query.

Referring now to the figures of the drawing in detail and first, particularly, to FIG. 1 thereof, there is shown a flowchart for implementing a database query. Typical properties of a database record are retrieved at A1. Then, search criteria options are created at A2 for all of the properties. Then, search criteria tables are created at A3 for all of the search criteria options. Subsequently, indexes are created at A4 for all of the search criteria tables. Then, a set of search criteria options selected by the user are retrieved at A5 from a graphical user-interface which is not represented in FIG. 1. Then, a first search criterion of the user-selected search criteria options is loaded at A6. Then, a corresponding search criteria table to the loaded search criterion is added at A7 to a table list. Then, a corresponding index to the added search criteria table is itself added at A8 to an index list. Then, it is checked at Q1 if the loaded search criterion has been a last entry of all the user-selected search criteria options. If this is not the case, a next user-selected search criterion is being loaded at A6 and its corresponding table and index are added to the table list at A7 and to the index list at A8 respectively. As soon as a last search criterion of the user-selected search criteria options has been processed, the table list and the index list are exported at A9 to a database engine. Then, the database query is performed at A10 by the database engine, based on the table list and on the index list. Finally, a query result is returned at A11 to the user. It is noted that for a same, unchanged database, the actions at A1 to A4 only have to be carried out once, meaning that a subsequent query starts with the action at A5. Furthermore, for reasons of clarity an action of selecting a combination function is left out of the flowchart in the FIG. 1.

FIG. 2 is a table showing an example of a database table describing the contents of a stock room. A first column, labelled as "PRODUCT", contains products to be found in the stock room. A second column, labelled "LOCATION", contains a description of a location for each of the products. A third column, labelled as "PACK", contains information about a packaging type of each of the products. A fourth column, labelled as "FACTORY", contains information about a factory where each of the products has been manufactured. For example, taking a second row in the table of FIG. 2, a product called "Mushroom soup" is located in "Rack 1.1.1", is packed in a package type "Can" and is produced by factory "F1".

It is noted for reasons of clarity that the tables in FIGS. 3-6 are related to the database table in FIG. 2. Furthermore, only one search criterion is taken into account, this being the following the location with the label "LOCATION". All other possible search criteria, these being the products, the packaging type and the factory, are analogous to the search criterion "LOCATION".

FIG. 3 is a table showing an indexing of the location by the products. For example, the product "Mushroom soup" is found in the locations "Rack 1.1.1" and "Rack 1.1.4".

FIG. 4 is a table showing an indexing of the location by the packaging type. For example, the package type "Can" is found in the locations "Rack 1.1.1", "Rack 1.1.3" and "Rack 1.1.5".

FIG. 5 is a table showing an indexing of the location by the factory. For example, products manufactured in the factory "F1" are found in the location "Rack 1.1.1".

FIG. 6 is a table showing a list of all available locations.

The query is performed at A10 by a join operation between the main database table and the search criteria tables corresponding to the plurality of the search criteria options. The join operation, which is a typical operation common to relational database systems, is performed according to the present invention between the main table and all of the search criteria tables corresponding to the user-defined combination of the plurality of the search criteria options, advantageously allowing the user to increase the complexity of the query. In the database as shown in FIG. 2, this means that the user has the possibility to query for the location by for example taking into account the packaging type and the factory. In this case, the main database table is joined with the tables of FIGS. 4 and 5.

The plurality of the search criteria options are chosen out of the totality of the search criteria options. This advantageously makes it simple for the user to define all important properties for the query by choosing from a list of all possibilities. Furthermore it prevents a query using an undefined property. This is particularly important in case the database has been changed and a certain property has been removed prior to the query.

The user-defined combination is based on choosing at least one user-selectable combination function and is further based on providing the plurality of the search criteria options as parameters to the combination function. A range of functions which are applicable for the database structure is provided to the user, making it easy to narrow down the query. Depending on the required complexity of the query, a suitable combination function is chosen and the user-selected search criteria options to be taken into account by the query are simply substituting placeholders within the function.

Preferably, the combination function is chosen out of a totality of Boolean operations. This advantageously allows a series of options for the query, for example combinations of properties like a search for items with a first and a second property only, options of properties like a search for an item with the first or with the second property and exclusion of properties like a search for items which lack the first property. Following the example in the database of FIG. 2, the combination of properties yields a first query option: the product "Mushroom soup" packed in the package type "Can" and originating from the factory "F1". The option of properties yields a second query option: the product "Mushroom soup" packed in the package type "Can" or packed in the package type "Bag". The exclusion of properties yields a third query option: the product "Mushroom soup" packed in everything else than the packaging type "Can".

For each one of the plurality of the search criteria options, the corresponding search criteria table and the corresponding index is retrieved and provided at A9 to the database engine in order to access the main database table. Out of a totality of the created indexes, only specific indexes corresponding to the plurality of search criteria options are chosen to be passed as parameters to the database engine. Thus, an overhead of calculations and scanning effort is eliminated. There is only a one-time effort to create all possible indexes which then are present as a pool of choice for the user to customize the query. Subsequently, specific search criteria tables corresponding to each of the chosen search criteria options are retrieved and then all specific indexes corresponding to the specific search criteria tables are provided to the database engine in order to carry out the query, thus a plurality of indexes are used for a single query.

A preferred embodiment of the method according to the present invention unites all necessary algorithms in software being organized as a library, the library being importable in a database software system. This advantageously increases the flexibility of the method by providing a possibility to apply its concepts to existing systems, without requiring major modifications to the database system itself or to the database structure.

The invention claimed is:

1. A non-transitory computer-readable storage medium with an executable program stored thereon and being organized as a software library, the library being importable in a database software system, wherein the program instructs a microprocessor to perform the steps of:

retrieve a number N of properties of a record within a main database table, the number N being higher than zero;

create a search criteria option for each of the N properties;

create a separate search criteria table for every search criteria option;

create a separate index table for every search criteria table only once, wherein there is at least one common search criteria option between the index tables;

present on a user-interface search criteria options for a user to select;

select the search criteria options for forming a user-defined combination of a plurality of the search criteria options and associated indexes; and perform the database query based on the user-defined combination of the plurality of the search criteria options and the associated indexes.

2. The non-transitory computer-readable storage medium according to claim 1, wherein the program instructs the microprocessor to perform the further step of performing the database query by a join operation between the main database table and the search criteria tables corresponding to the plurality of the search criteria options.

3. The non-transitory computer-readable storage medium according to claim 1, wherein the program instructs the microprocessor to perform the further step of basing the user-defined combination on choosing at least one user-selectable combination function and is further based on providing the plurality of the search criteria options as parameters to the user-selectable combination function.

4. The non-transitory computer-readable storage medium according to claim 3, wherein the program instructs the microprocessor to perform the further step of choosing the user-selectable combination function out of a totality of Boolean operations.

5. The non-transitory computer-readable storage medium according to claim 1, wherein for each one of the plurality of the search criteria options, the corresponding search criteria table and the corresponding index is retrieved and provided to a database engine in order to access the main database table.

6. A system for performing a database query in a relational database, the database query being carried out by a database engine and being based on user-defined search criteria, the system comprising:

the relational database having a non-transitory computer-readable storage medium;

a microprocessor programmed to:

retrieve a number N of properties of a record within a main database table, the number N being higher than zero;

create a search criteria option for each of the N properties;

create a separate search criteria table for every search criteria option;

create a separate index table for every search criteria table only once, wherein there is at least one common search criteria option between the index tables;

present on a user-interface search criteria options for a user to select;

select the search criteria options for forming a user-defined combination of a plurality of the search criteria options and associated indexes; and perform the database query based on the user-defined combination of the plurality of the search criteria options and the associated indexes.

7. The system according to claim 6, wherein the database query is performed by a join operation between the main database table and the search criteria tables corresponding to the plurality of the search criteria options.

8. The system according to claim 6, wherein the user-defined combination is based on choosing at least one user-selectable combination function and is further based on providing the plurality of the search criteria options as parameters to the user-selectable combination function.

9. The system according to claim 8, wherein the user-selectable combination function is chosen out of a totality of Boolean operations.

10. The system according to claim 6, wherein for each one of the plurality of the search criteria options, the corresponding search criteria table and the corresponding index is retrieved and provided to the database engine in order to access the main database table.

* * * * *